(12) United States Patent
MacCloskey

(10) Patent No.: US 7,774,270 B1
(45) Date of Patent: Aug. 10, 2010

(54) CREDIT REPORT LOCK SYSTEM

(76) Inventor: Randy MacCloskey, 4241 Compton Ave., Rockford, IL (US) 61101

( * ) Notice: Subject to any disclaimer, the term of this patent is extended or adjusted under 35 U.S.C. 154(b) by 814 days.

(21) Appl. No.: 11/062,028

(22) Filed: Feb. 18, 2005

Related U.S. Application Data

(60) Provisional application No. 60/602,924, filed on Aug. 19, 2004.

(51) Int. Cl.
*G06Q 40/00* (2006.01)
(52) U.S. Cl. ....................................................... 705/38
(58) Field of Classification Search .................... 705/38
See application file for complete search history.

(56) References Cited

U.S. PATENT DOCUMENTS

| | | | |
|---|---|---|---|
| 5,963,915 A * | 10/1999 | Kirsch | 705/26 |
| 2002/0091842 A1 | 7/2002 | Hoffeld | |
| 2003/0037001 A1 | 2/2003 | Richardson | |
| 2003/0069839 A1* | 4/2003 | Whittington et al. | 705/38 |
| 2003/0163483 A1* | 8/2003 | Zingher et al. | 707/104.1 |
| 2003/0233542 A1 | 12/2003 | Benaloh | |
| 2004/0054919 A1 | 3/2004 | Duri et al. | |
| 2005/0038872 A1* | 2/2005 | Ono et al. | 709/218 |

* cited by examiner

*Primary Examiner*—Richard C Weisberger

(57) ABSTRACT

A method and system to protect, manage and control access to credit reports by the consumer. The company provides a website for the consumer to lock his credit report from being viewed without authorization. The report may be accessed via a previously assigned ID number and password. For a merchant to obtain the credit report, the consumer must grant access. The system eliminates manual intervention with access codes to lock or grant access to the report. Response to requests to access a report is instantaneous with the correct access code. Before a consumer subscribes, his is challenged to prove his identity. The verification method is based on his using a credit card to pay for the service that has the same name as the person in which they are attempting to subscribe to the service as. Address verification is provided by the credit card company. A credit report is then pulled from each of the credit reporting agencies, and the data used to further challenge the consumer's identity. Once correct identity has been established, the consumer enters an access code that is stored and instructions transmitted to the credit reporting agencies. Instructions are sent to the credit reporting agencies requiring them to lock the consumer's credit report and assign an access code to the file for consumer access. The system gives the consumer total control in protecting credit information from theft or misuse.

4 Claims, 9 Drawing Sheets

FIG. 1  CREDIT REPORT LOCK FLOWCHART

CREDIT REPORT LOCK REQUESTING PROCESS

US 7,774,270 B1

CREDIT REPORT LOCK SYSTEM

CROSS-REFERENCES TO RELATED APPLICATIONS

This application claims priority to and the filing date benefit of U.S. Provisional Patent Application Ser. No. 60/602,924, filed Aug. 19, 2004.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to a method and system to protect a consumer from identity theft and misuse of his private credit information stored with the various credit reporting bureaus.

More particularly, the invention relates to a method and system to protect, manage and control access to information in consumers' credit reports.

2. Background Art

TransUnion, Equifax and Experian are the largest credit reporting bureaus (alternately referred to as credit reporting agencies) that collect and disseminate credit history and information, or credit reports, about consumers.

Banks, merchants, credit card issuing companies, and other businesses and credit agencies use the credit reports to make credit granting decisions. Currently, no bank, merchant or other agency generally needs any authorization to run a credit check or obtain a credit report on a consumer. Such credit inquiries can be adverse to the consumer, and does lower what is called the Beacon Score. The Beacon Score is used by banks, merchants and other credit agencies to grant credit.

Thieves obtain a consumer's personal information and then they run a credit report in order to gain all of an individual's personal information in order to steal his identity. Once a thief has stolen an identity, they attempt to obtain credit in the name of his victim. When a merchant obtains a credit report in the name of the victim it lowers the Beacon Score whether or not credit is granted to the thief, thereby impacting the victim without his knowledge. When the real person (victim) attempts to obtain credit they may be denied based upon erroneous information contained in the credit bureau reports.

There are limited measures available to consumers to protect against adverse consequences of unwanted credit inquiries, such and provisions in the credit laws regarding "permissible purpose" and destination between certain types of credit inquiries for reporting purposes. A couple of states have enacted so-called "security freeze" laws by which a consumer can lock his or her credit report from unwanted inquiries, and then control unlocking of their report and to whom it will be given, and a few other states are investigating implementation of such measures. However, such protections are currently implemented on a state-by-state basis, and where implemented, are burdensome to the consumer and require the consumer to interface with multiple agencies at a time.

The present invention is born of the need to protect and to control personal credit information, and to provide a system, method and service that accomplishes such protection and control with ease and convenience on the part of the consumer. Typically, the credit reporting bureaus and not the individual decides who has access to the personal information and when they can access that information. The consumer may not know that the credit information being accessed is correct or incorrect.

The credit reporting bureaus have become overloaded from consumer complaints regarding incorrect and sometimes fraudulent information contained in a consumer's credit report information. The system of the present invention restricts access to a consumer credit report to only those for which the consumer has expressly entered the code for or which the consumer enters his personal access code at the merchant location.

Various systems related generally to data inquiry and data protection are known in the art, and are disclosed in, for example, Hoffeld, US Pub. No. 2002/0091842; Zingher et al., US Pub. No. 2003/0163483; Richardson, US Pub. No. 2003/0037001; Benaloh, US Pub. No. 2003/0233542; and US Pub. No. 2004/0054919. However, a method, system and service to fully protect, manage and control access to information in credit reports with relative ease on the part of the consumer is not available or known in the art.

SUMMARY OF THE INVENTION

The general objective of the present invention is to provide a new and unique method and system to protect a consumer from identity theft and misuse of his private credit information stored with the various credit reporting bureaus.

More particularly, the invention involves a system (and method) for a data service to protect, manage and control access to personal information associated with a consumer credit report. The system is an automated system for consumers to protect, manage and control access to his personal credit report information. The company (i.e., data service) provides a website that allows a consumer to enroll with the service, and lock his (or her) credit report from being viewed by anyone other than someone (e.g., a merchant, bank, etc.) specifically granted access to the information by the consumer, and to optionally grant such access to the credit report. The website may be accessed via a previously assigned identification number and password. In order for a merchant to obtain credit information on an individual, the merchant must be previously granted access by the consumer, or the consumer must enter his personal access code when applying for credit at the location of the merchant. The consumer thus controls access to his private credit report information. The system eliminates the need for manual intervention by the use of access codes in completing the request to lock the information or grant access to a merchant. Response to third parties and or merchants requesting access to the credit report information is instantaneous based upon the consumer entering the correct access code or previously granting access to that merchant by entering the merchant's ID code for access on the website.

Before allowing a consumer to subscribe (i.e., enroll) to the credit report locking system, a consumer is challenged to prove his identity. The method for verifying a consumer's identity is based on his using a credit card to pay for the service that has the same name as the person in which they are attempting to subscribe to the service as. Address verification from the credit card company is then attempted. Once the address is verified a credit report is then pulled from each of the credit reporting agencies. Data from those reports is used to create a questionnaire to further challenge the consumer to verify his identity. Once the consumer's identity has been established, the consumer is instructed to enter an access code. The access code is stored in the company database and then instructions are transmitted to the credit reporting agencies via secure and authenticated communications. The instructions are sent to the credit reporting agencies requiring them to lock the consumer's credit report and to assign the access code to the file so that the consumer may access the file at any time, but no one else can access the file without the consumer's permission. In other words, no one will be given the consumer's credit report without the consumer providing his personal access code to the credit reporting agency and associating it with the third-party's ID code to thereby grant permission for the credit reporting agency to send the third party the requested credit information. The system gives the consumer total control in protecting his private credit information from theft or misuse.

Alternately, instructions are sent to the credit reporting agencies requiring them to lock the consumer's credit report, but the access code assigned to the file is that of the data service so that only the consumer and the data service can access the consumer's credit file. In this instance, all requests for the consumer's credit report from a third party are routed through the data service which checks to verify that the consumer (i.e., the service's customer) has authorized such third party to receive the credit report. If the third party has authorization from the customer, then the data service submits the request to the credit reporting agencies to unlock the consumer's credit file, send the customer's credit report to the third party, and then re-lock the consumer's file. With either implementation, communicating to the data service or directly to the credit reporting agencies, the system gives the consumer total control in protecting his private credit information from theft or misuse.

The advantage of the present invention is that it allows a third party to have authorized access to a consumer credit report through use of the Internet in which the consumer enters his personal access code to allow the merchant, bank or other credit provider to obtain a credit report; or alternately through other secure data transmission means for enabling the consumer to enter his personal access code and associate such entry with the third party's ID code to enable the third party to receive the consumer's credit report. This system and service would virtually eliminate credit fraud and identity theft.

The consumer's personal access code is known only to the consumer and is never given out to any business or other third party. In one implementation, when the access code is required, the consumer simply enters his access code on a key pad that is connected to a computer of a third party that is requesting the credit report. When the access code is entered, it is masked on the web page such as by the appearance on the screen of only asterisks (*******) for each character that is entered. This prevents the merchant, bank or any individual from obtaining the consumer's personal access code. The consumer is, of course, encouraged to change his access code from time to time at his discretion. In this implementation, the merchant then enters its ID code onto the web page and transmits the request. In this way, the consumer's personal access code and the merchant's ID code are associated, authorizing the consumer's credit report be sent to that merchant.

At the time that the consumer terminates his membership subscription to the service, the lock on his credit report is removed and all merchants, banks, and credit reporting agencies will then have access to the consumer's private credit report information unless the consumer make other arrangements for locking his credit report.

The credit report lock service will store personal information about the consumer as well as current copy of his personal credit report and profile.

When a merchant, bank or other third party makes a credit report inquiry without being authorized by the consumer, that merchant, bank or credit reporting agency is sent a message that indicates the consumer has locked his credit report and it will be necessary for that agency to contact the consumer in order to be granted access to that consumer's credit report. All requests for the consumer's credit report from a third party are denied unless the consumer has associated his personal access code with that party's ID code.

When the merchant, bank or other third party makes a credit report request to the credit reporting agencies, the party will be required to enter its ID code. If the ID code matches a code on file in the consumer's file, the credit report will be furnished to the requester. Once the report is furnished, the code on file with the consumer's file is then removed and the merchant, bank or agency that requested the credit report previously would have to obtain further authorization in order to obtain a subsequent credit report on that consumer.

This invention allows the consumer to control the access to his personal credit report. This empowers the consumer to determine to whom and when his personal credit information is accessed.

These and other aspects, objectives and advantages of the invention will become more apparent from the following detailed description when taken in conjunction with the accompanying drawings.

Figure 1:
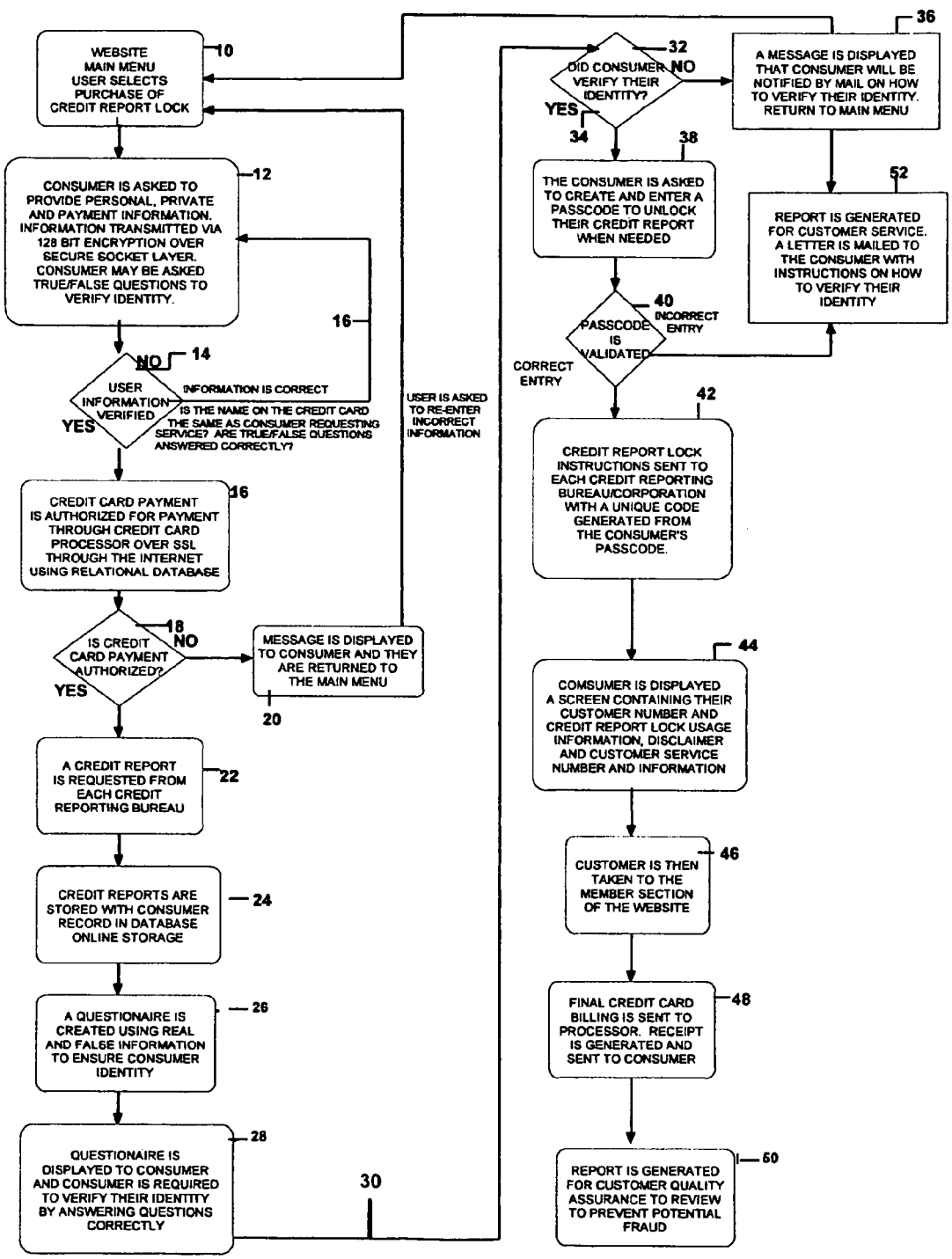
FIG. 1 is a flowchart of a credit report lock system and method in accordance with the invention.

While the invention is susceptible of various modifications and alternative constructions, certain embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Referring to FIG. 1 there is shown a flowchart for one embodiment credit report lock method and system in accordance with the invention. Beginning at a website main menu (indicated at 10), the user will select to purchase the lock system for his credit report. The consumer is presented with a data entry screen, and is asked (at 12) to provide personal, private and payment information which is transmitted such as via 128 bit secure socket layer, or other suitable secure encryption method, over the Internet to the system computer of the data service. This user information undergoes validation (at 14). If the user information is validated, then the system notes (at 16) that credit card payment is authorized for payment through the credit card processor through the Internet. If the user information cannot be validated or is incorrect, then the user is looped back (at 16) and is asked to enter the correct information.

Following entry of validated information, the system checks (at 18) to see if credit card payment is authorized. If not, a message is displayed (at 20) to the consumer and he is returned to the main menu (10). If credit card payment is authorized, a credit report is requested (at 22) from each credit reporting bureau, and they are then stored (at 24) with the consumer record (the personal information) in the system online database storage.

A questionnaire is also created (at 26) using both real and arbitrary false information about the consumer to ensure consumer identity is protected. The questionnaire is displayed (28) to consumer and the consumer is required to verify his identity by answering questionnaire. A check (30) is then performed to confirm the consumer was able to verify his identity. Should the consumer be unable to verify his identity at this point, a message is displayed (36), informing the consumer he will be notified by mail on how to verify his identify, and the system returns to the main menu (10). A report is also automatically triggered for mailing to the consumer (at 52).

With the identity verification successful, the consumer is asked (at 38) to enter a passcode (access code) to unlock his credit report when needed. If the passcode is validated (at 40) as meeting the designated system requirements, then credit report lock instructions are sent (at 42) to each credit reporting bureau, with a unique code generated from the consumer's passcode. Next, the consumer is displayed a screen (at 44) containing his customer number and credit report lock usage information, a disclaimer, and contact information for customer service. The customer is then taken to the member section of the website (at 46). Thereafter, a credit card billing is sent to system processor (at 48) for charges by the service and charges by the credit reporting agencies to lock the consumer's credit report. A receipt is then generated and sent to customer, and a report is generated (at 50) for customer quality assurance, and to review to prevent potential fraud to the system.

Figure 2:
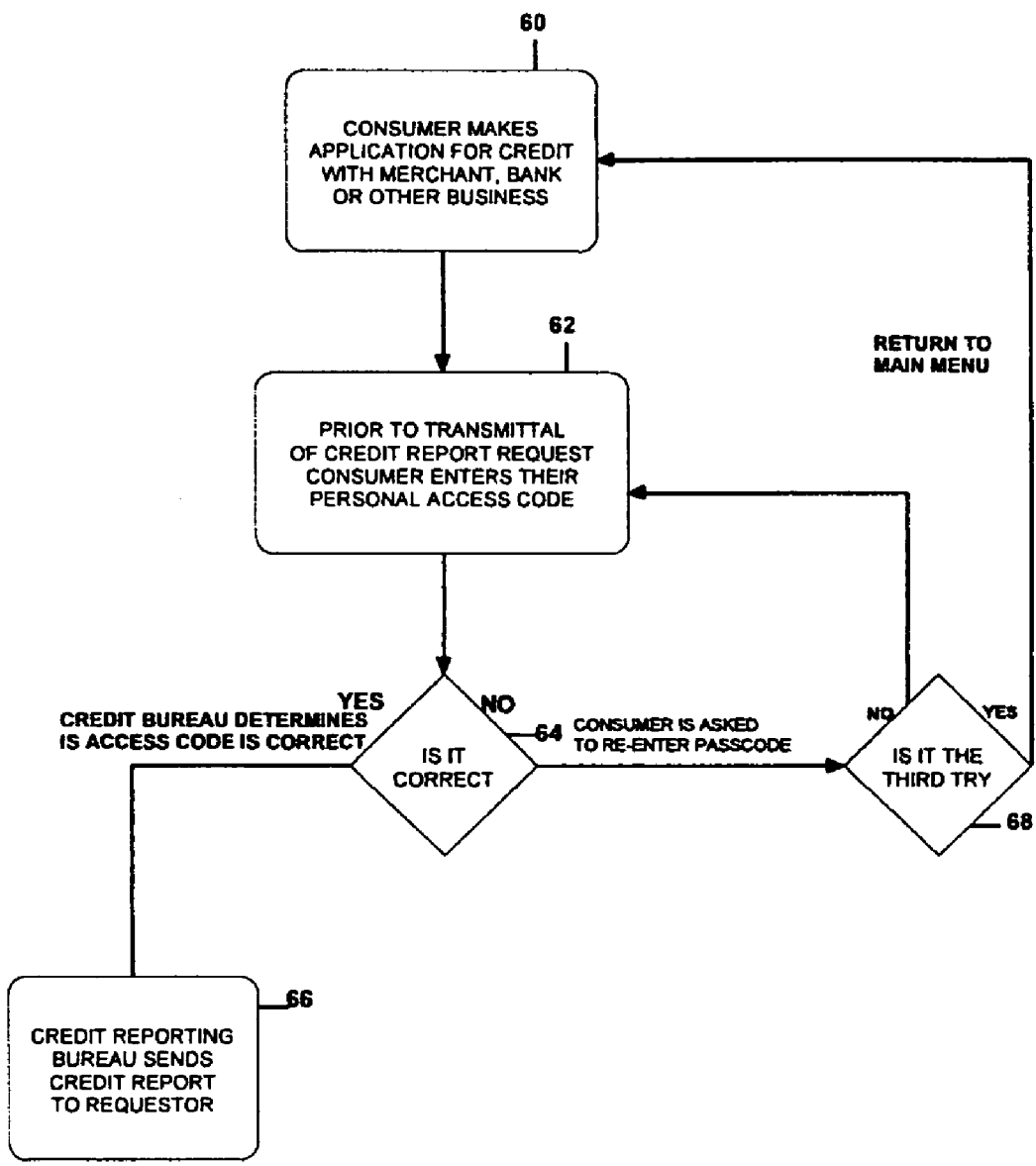
FIG. 2 is a flowchart of a credit report requesting process of the invention.
Figure 2A:
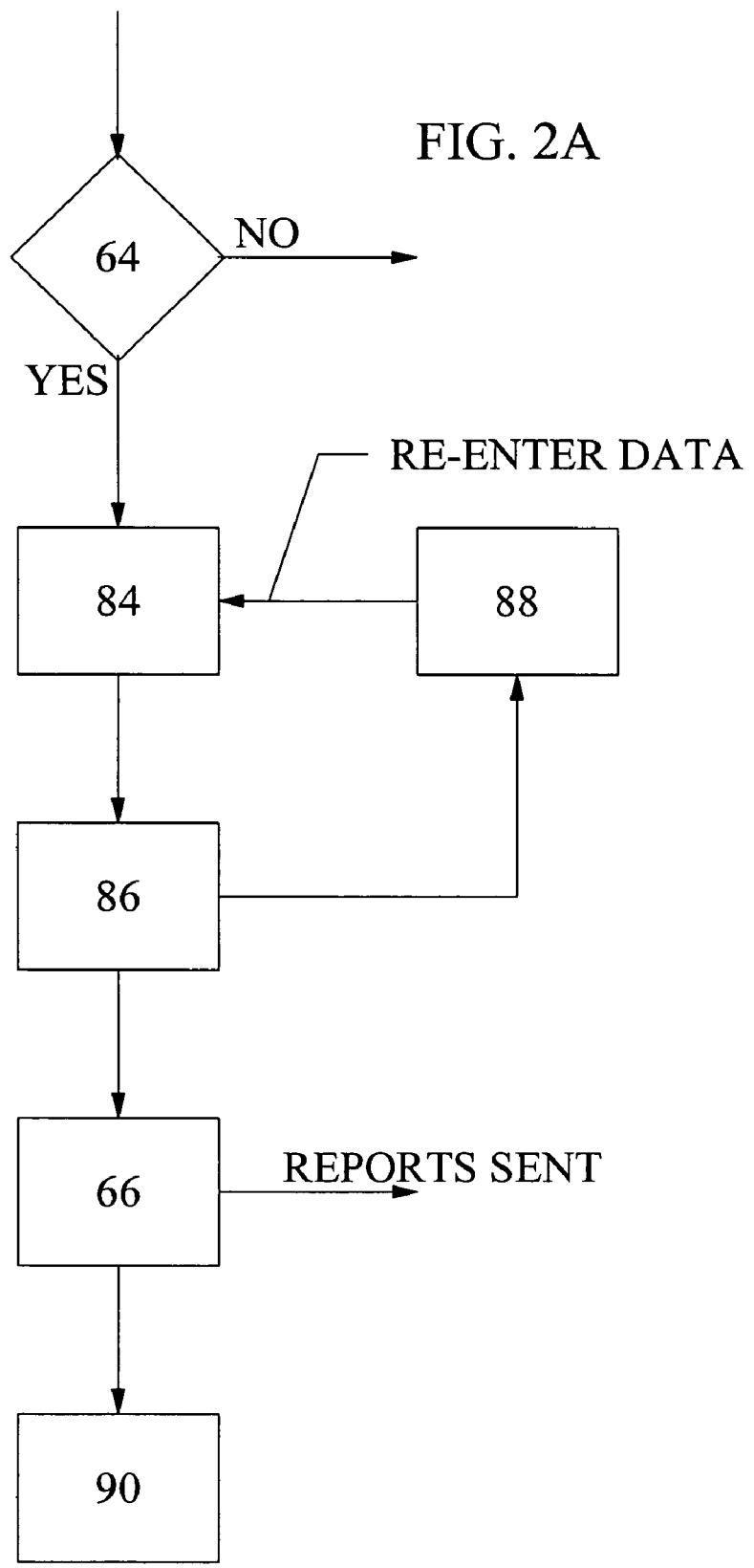
FIGS. 2A-B are flowchart of alternate sub-methods for the flowchart shown in FIG. 2 for controlling access to and charges for providing authorized credit report to a third party.

The flowchart of FIG. 2 illustrates one embodiment credit report requesting process for the invention. If the consumer makes an application for credit with a merchant (bank or other business) (at 60), then prior to transmittal of the credit report request by the merchant with its ID code, the consumer enters his name and personal access code (at 62). If the access code is incorrect (as associated with the name entered), the consumer will have one or two more tries (at 68) before he is locked out of the system. When the access code is confirmed correct (at 64) then the credit reporting bureau sends the credit report to requestor as identified by the requestor's ID code. The costs for this transaction will be charged to either the consumer or the business, or distributed as agreed between them, and the processing of the request will be implemented accordingly. For example, one implementation of cost handling is illustrated in FIG. 2A. If the access code is verified at 64 as correct, then the consumer and/or business enters credit card information at 84 to cover the charges of the credit bureau for unlocking and re-locking the credit report if applicable, and for providing the credit report to the business. This information is verified at 86 such as previously described and for authorization of the anticipated charges. If verification or authorization fails, the consumer and/or business are notified at 88 of inability to verify credit card information or to obtain authorization for the charges from the credit card company, and are given an appropriate opportunity to reenter correct or different credit card information at 84. If both verification and authorization are successful, the credit reporting agencies send the credit reports to the requestor (66) and process the charges (90) against the credit card.

Figure 2B:
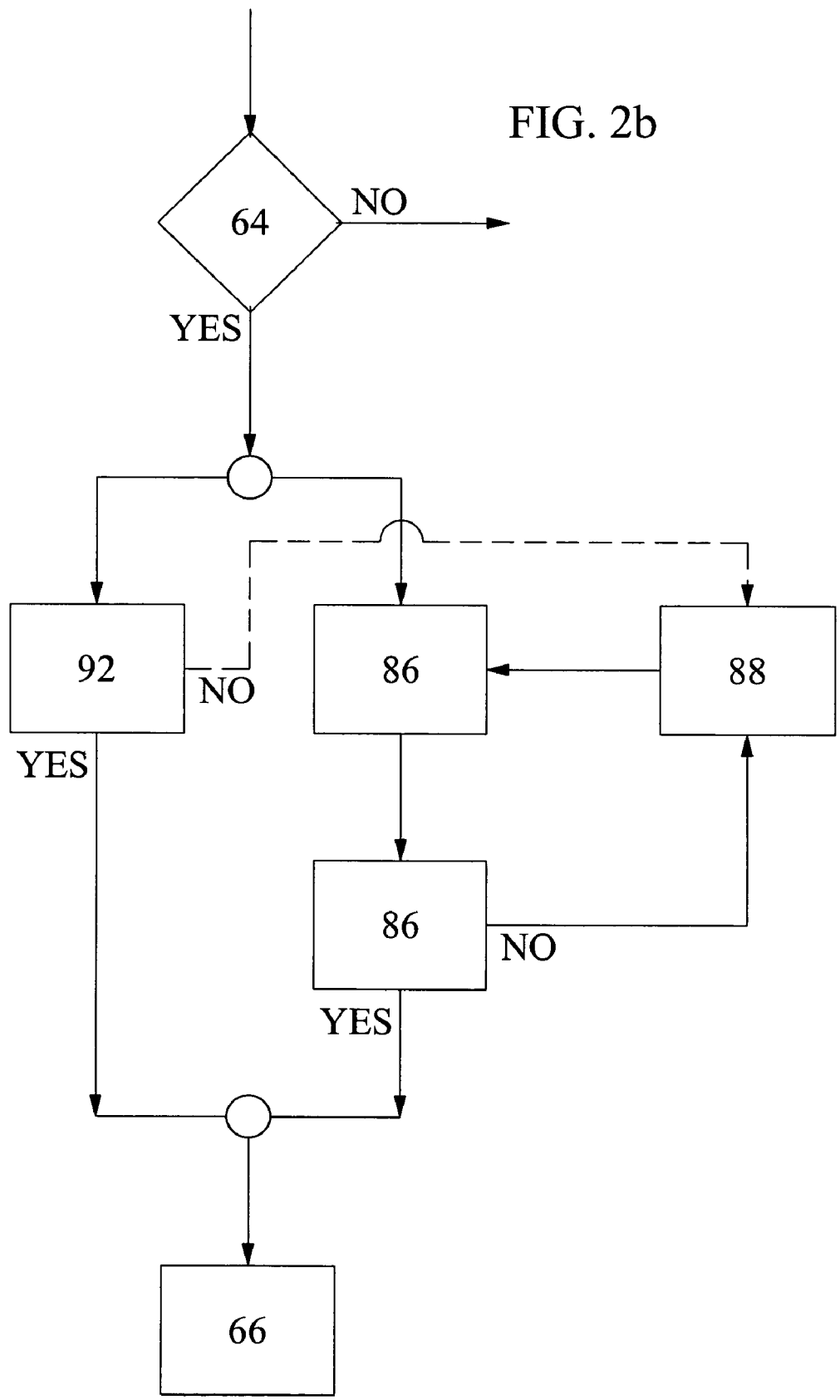

As further example, an alternate implementation of cost handling is illustrated in FIG. 2B where requests for the consumer's credit reports are processed through the service. In this instance, if the access code is verified at 64 as correct, then the consumer and/or business may enter credit card information at 84 to cover the charges of the credit bureau for unlocking and re-locking the credit report if applicable, and for providing the credit report to the business. Alternately, if the consumer's credit card is file with the service and pre-authorized charges for valid requests approved by the consumer, then the service checks for authorization of the anticipated charges for the specific request as indicated at 92 against the consumer's credit card in its file. If the charges are authorized by either procedure, then the credit bureau is authorized by the service to send the credit report to the requestor (66) and the charges for the credit reporting bureaus and the data service are processed against the consumer's credit card. In the first instance, if verification or authorization fails, the consumer and/or business are notified at 88 of inability to verify credit card information or to obtain authorization for the charges from the credit card company, and are given an appropriate opportunity to reenter correct or different credit card information at 84. In the second instance, if authorization of anticipated charges fails, the request is rejected, the consumer and/or business are notified and flow is redirected to a selected applicable location in the process, such as simply notification of the non-authorized condition, or optional redirection to notification as 88 with the option to enter different credit card information at 84. The service will add charges sent to the credit card processor for processing the request according to the contract between the consumer and the service.

With the method and system of the present invention, the consumer is permitted to lock his file from use by anyone else, and the consumer is not allowed to remove or otherwise alter any of the data contained in the report other than that previously available to make changes to. These aspects, among others, distinguish the present invention from various prior systems noted above.

Figure 3:
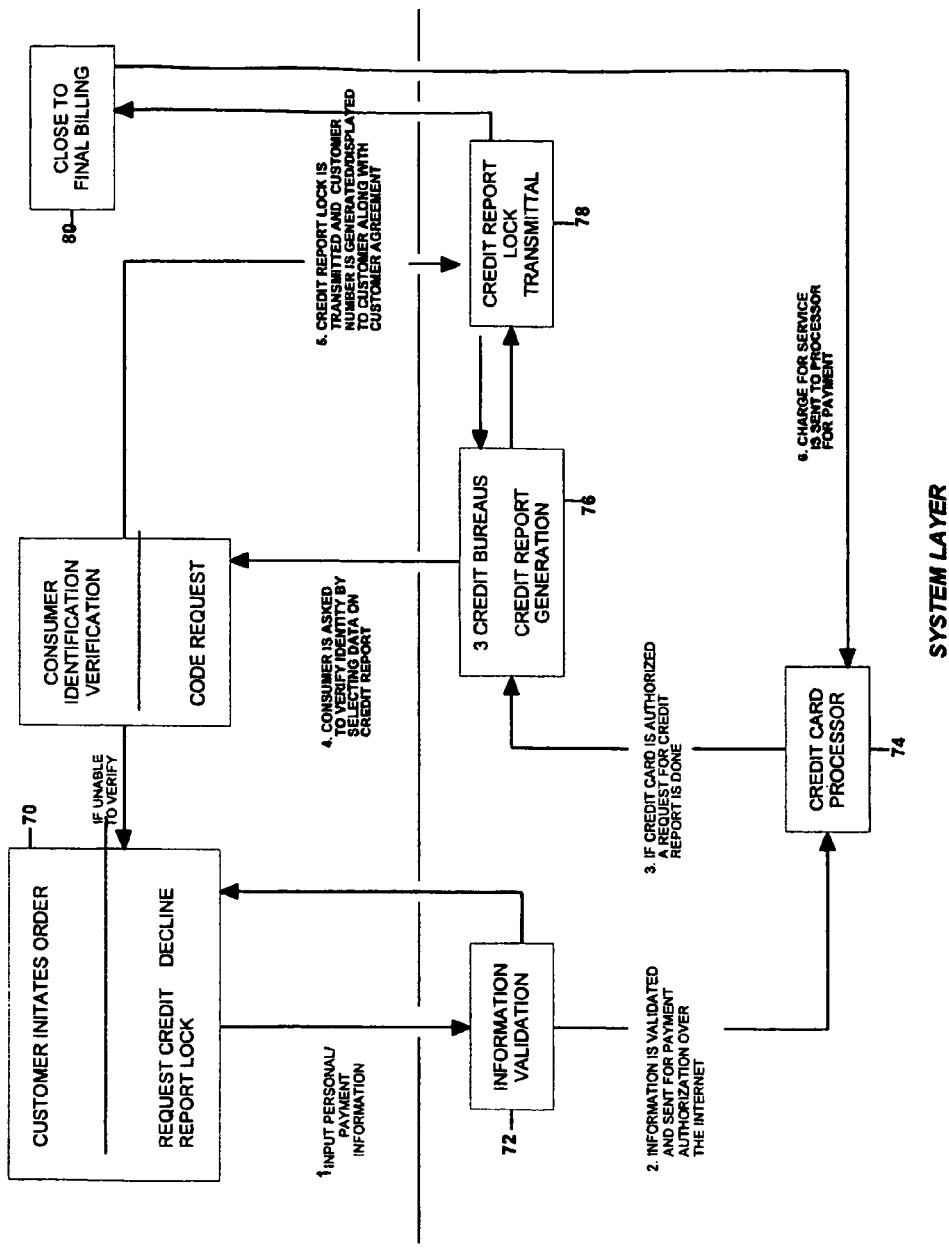
FIG. 3 is a flowchart of user and system layers of one implementation of the invention.

As further illustration, one implementation of a user and system layer for a credit report lock system is presented in FIG. 3. When the customer initiates an order (at 70), he inputs his personal and payment information which undergoes a validation check (at 72). If the information cannot be verified, service is declined. If the information is validated, then the request is sent for payment authorization over the Internet to the credit card processor (at 74) for charges by the service company and costs to be paid to the credit reporting agencies. After charge against the credit card is authorized, a request for the credit report is forwarded to the 3 credit bureaus (at 76). The consumer is then asked to verify his identity by selecting data on credit report. With the consumer identification verified, a code request is initiated and submitted. The credit report lock is transmitted and the customer number is generated and displayed to the customer. This is sent back to the credit bureaus to generate the credit report, and to billing (at 80) for processing to charge for the service.

A typical credit application process with the credit report lock system will typically proceed as follows. The consumer goes to the merchant, bank or company in which the consumer is requesting credit. In this case the consumer makes the request at the location in which the credit will be granted. The consumer fills out the credit application. Upon the merchant, bank or company requesting a credit report from the credit reporting bureau, the consumer is required to enter his personal access code. In the case where the merchant bank or company is requesting the report over the Internet the separate keypad is connected to the computer. When the consumer types in his access code the website causes asterisks (**) to appear on the screen. In the event the consumer is making application by phone, the consumer will key the access code by a touch-tone phone and the computer program at the data service or credit reporting agency will take the access code and convert the alpha-numeric information into asterisks (**) preventing the third party or person taking the information from having access to the code.

Upon the information being transmitted to the credit reporting bureaus (or alternately to the data service), the following process is used by the software: (1) The credit reporting bureau (or data service) uses the information provided to look up the consumer's file. (2) Once the consumer's file is found it is then checked to determine if the file is locked. If it is locked, the software checks to determine if the access code is correct. (3) If the access code is correct the credit report is authorized and provided to the requester. (4) If the access code is incorrect, the request is denied, and a message is sent to the requester instructing them to reenter the access code. (5) If the access code is entered incorrectly three (3) times, the file is locked and a letter is generated to the consumer notifying them that his credit report file has been locked and they need to contact the data service or credit reporting bureau for further information on who was attempting to access his credit report and/or to unlock the credit report for further use.

Figure 4:
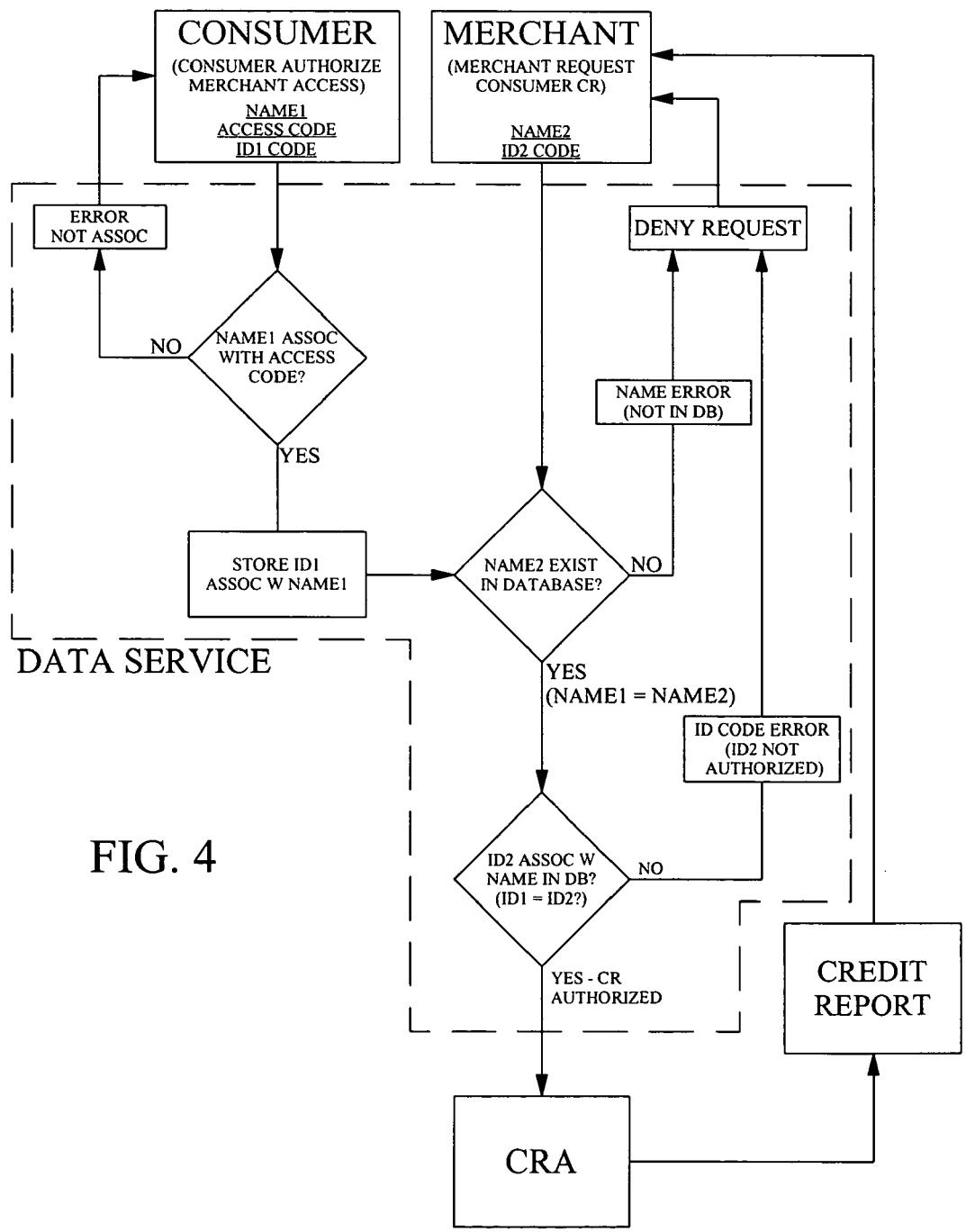
FIG. 4 is a flowchart of certain additional details of a credit report requesting and verification process.

For further illustration purposes, there is presented in FIG. 4 a flowchart of certain additional details of a credit report requesting and verification process. In this instance, the consumer and the merchant may utilize the same or separate computers to initiate corresponding actions. For example, the consumer enters in a computer and transmits to the data service his or her name (NAME1), access code, and a merchant ID code (ID1 CODE). The service first checks to verify that the name entered by the consumer is in its database records in its computer and if it is whether the name is associated with the access code (in its database records) entered by the consumer. If there is no association, an error is returned to the consumer and the process halts, whereupon the consumer may re-enter the data up to two additional times before locking the records associated with either or both the name and access code entered. If there is association between the name and access code entered by the consumer, then the service stores the ID1 CODE entered by the consumer in the consumer's file into its computer database records on its computer harddrive. The merchant enters in a computer and transmits to the data service the name of the consumer for which a credit report is requested (NAME2) and the merchant's ID code (ID2 CODE). The service verifies (from its database records) that NAME2 is enrolled with the service and if not, returns an error to the merchant and denies the request for the consumer's credit report. If the NAME2 is enrolled with the service (i.e., a condition for NAME1=NAME2 is found to be existing or true) then the service checks to see if the merchant's ID code is associated with the consumer's name. In other words, the service verifies that the merchant has authorized that merchant to obtain the consumer's credit report (ID1=ID2?). If not, again an error is returned to the merchant and the request is denied. If the merchant ID codes match (ID1=ID2), then the service authorizes the credit reporting agencies to temporarily unlock the consumer's credit report, send the credit report to that merchant, and then re-lock that credit report file. Charges for this activity are handled by the service as discussed above.

Figure 5:
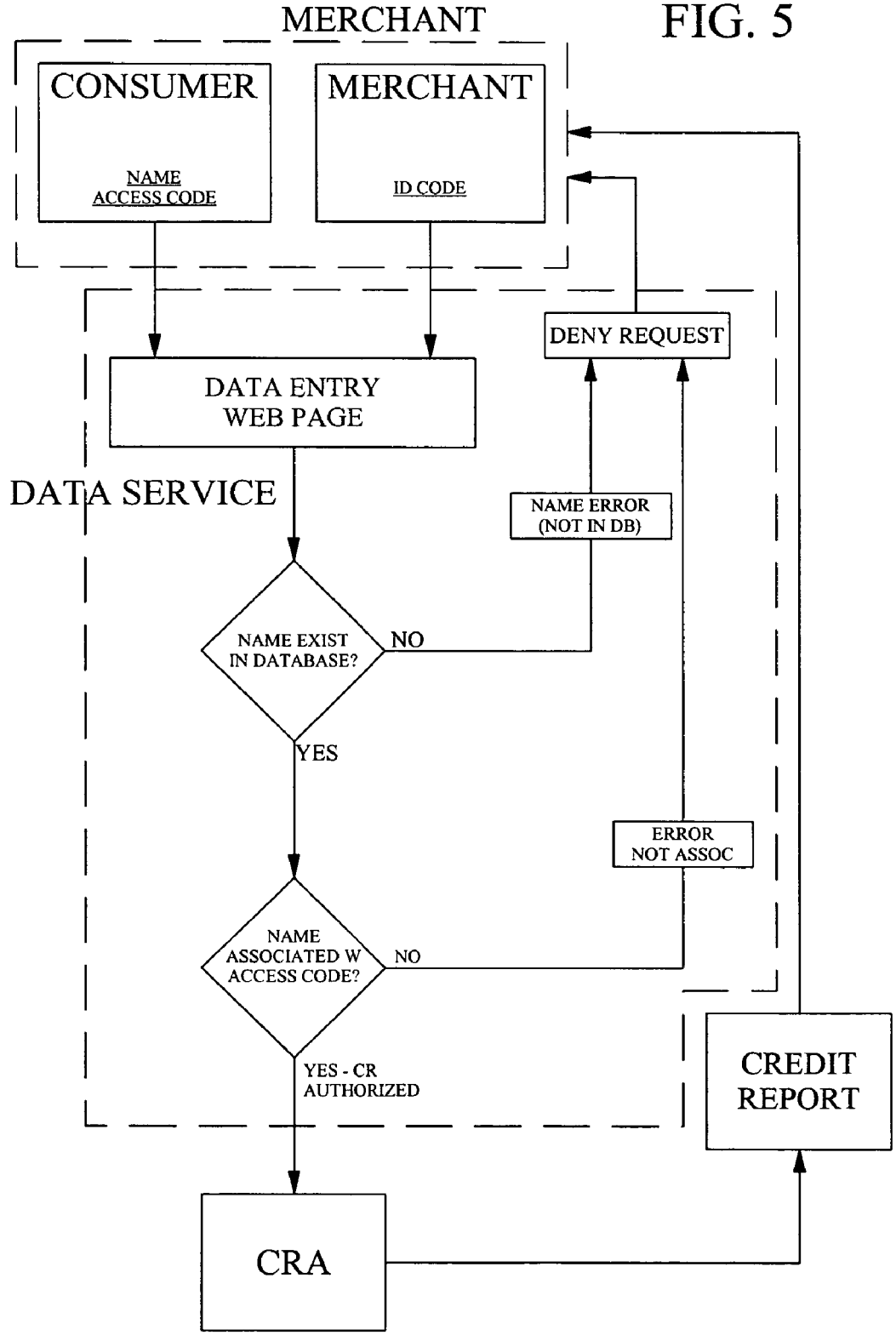
FIG. 5 is a flowchart of certain additional details of an alternate credit report requesting and verification process.

For further illustration purposes, there is presented in FIG. 5 a flowchart of certain additional details of an alternate credit report requesting and verification process. In this instance, the consumer is presented as entering authorization for access to his or her credit report at the merchant's computer location. The consumer enters his or her personal access code over the internet into a web page generated by the service computer as described above, and the merchant enters its ID code. This data is transmitted to the service which checks that the name is enrolled in the service, and if not returns an error to the merchant and denies the request. If the consumer is enrolled, then the service verifies that the name and access code match the information in its database records, and if not an error is again returned to the merchant and the request is denied. If the name and access code are found to be associated with each other, then the service authorizes the credit reporting agencies to temporarily unlock the consumer's credit report, send the credit report to that merchant, and then re-lock that credit report file, and again, charges for this activity are handled as discussed above. Other variations of these implementations for transmission and checking of the credit report requesting and verification process will be readily implemented by those skilled in the art.

Figure 6:
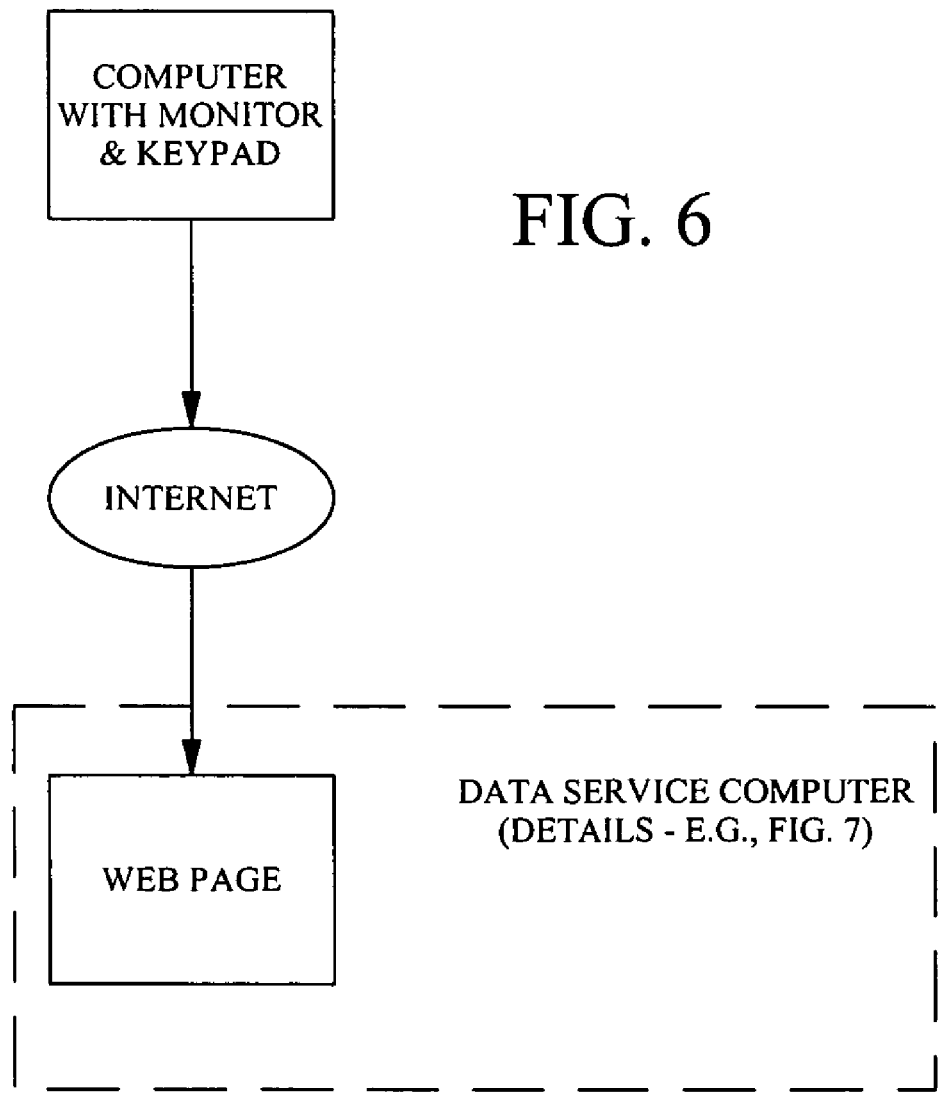
FIG. 6 is a diagram illustrating interaction between a consumer and/or merchant computer and a computer at the data service.
Figure 7:
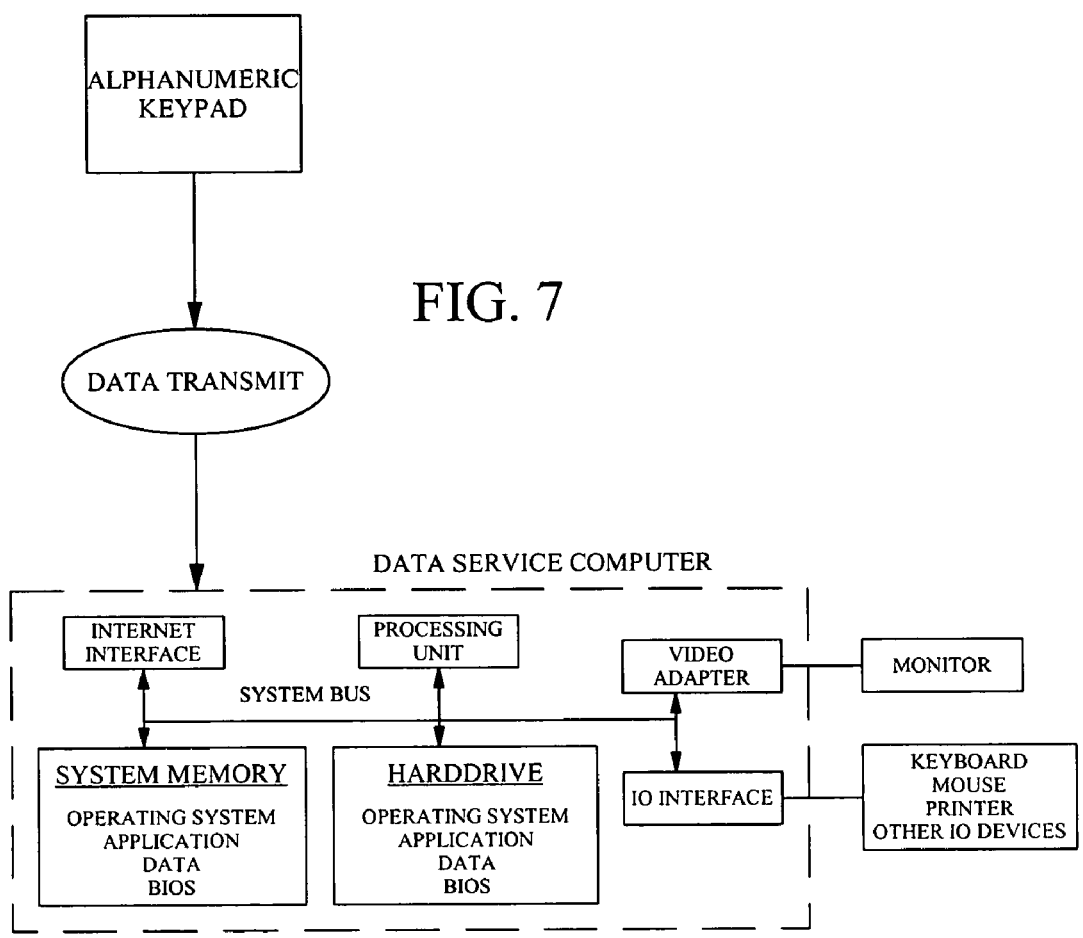
FIG. 7 is a diagram illustrating general interaction between a consumer and/or merchant computer and a computer (with computer component details) at the data service.

One diagram illustrating interaction between a consumer and/or merchant computer and a computer at the data service is shown in FIG. 6, and FIG. 7 presents a diagram illustrating the general interaction between a consumer and/or merchant computer and a computer at the data service, with the with service computer component details. As indicated, the computers are conventional computers with data entry and IO capabilities (e.g., keyboard, mouse, voice activated data entry, printers, etc.), a video adapter and monitor as applicable, system memory for the temporary storage of programs and data (the service database), a harddrive for permanent storage of programs and data, an internet interface (e.g., modem, broadband, etc.), a processing unit, and a system bus operatively connecting the applicable elements of the computer. The data entry, web page generation, data capture, data transmission and data verification of the processes of the invention are accomplished in these computers is a conventional manner.

From the foregoing, it will be apparent that the present invention brings a new and unique system and method to manage, control and protect an individual's credit report, and thereby substantially reduce or eliminate the possibility of unwanted access and credit identity theft.

The invention claimed is:

1. A method for controlling access to a consumer's credit report stored on a computer, the method comprising:
   a) providing:
      i) the consumer with:
         a) a user name uniquely associated with that consumer, and
         b) a user password associated with the user name;
      ii) a first data entry means configured for entry of:
         a) the user name and user password, and
         b) a request to lock the user's credit report;

iii) a first computer-implemented method for processing the request to lock the user's credit report entered into the first data entry means, the method including transmitting instructions to the computer via data transmission means to lock the user's credit report and thereby prevent access to the user's credit report by an unauthorized requester;

b) the consumer entering the user name and user password and the request to lock the user's credit report into the first data entry means;

c) executing the first computer-implemented method for processing the request to lock the user's credit report entered into the first data entry means, including transmitting instructions to the computer via data transmission means to lock the user's credit report and thereby prevent access to the user's credit report by an unauthorized requester;

d) further providing:
  i) a database containing user names associated with consumers and user passwords associated with the user names;
  ii) a second data entry means for entry of a request for the user's credit report;
  iii) communication means through which the request for the user's credit report is transmitted to the computer;
  iv) a third data entry means for entry of:
    a) the user name and user password, and
    b) a requester;
  v) means for associating the user name and the requester to identify the requestor as an authorized requestor upon entry of the user name and user password and the requestor into the third data entry means, said associating means being operative to associate the user name and the requester and to identify the requester as an authorized requester without the user having to disclose the user password to the requester;
  vi) a second computer-implemented method for processing the request for the user's credit report entered into the second data entry means; the second computer-implemented method being implemented in said communication means between the second data entry means and said computer whereby the request for the user's credit report must be processed by the second computer-implemented method; the method including:
    a) determining if the user name entered in the third data entry means is stored in the database of user names and user passwords; and
    b) if the user name entered in the third data entry means is stored in the database of user names and user passwords, then initiating authorizing instructions to the computer via data transmission means to (a) temporarily unlock the consumers credit report and allow access to or delivery of the user's credit report to an authorized requester and (b) then relock the user's credit report to prevent access to the user's credit report by an unauthorized requester;

e) the consumer further entering the user name and user password into the third data entry means;

f) entering:
  i) the requester into the third data entry means, and
  ii) the request for the consumer's credit report into the second data entry means;

g) associating the user name and the requester to identify the requester as an authorized requester upon entry of the user name and user password and the requestor into the third data entry means, said associating means being operative to associate the user name and the requester and to identify the requester as an authorized requester without the user having to disclose the user password to the requester;

h) executing the second computer-implemented method for processing the request for the user's credit report entered into the second data entry means, including:
  i) determining if the user name entered in the third data entry means is stored in the database of user names and user passwords; and
  ii) if the user name entered in the third data entry means is stored in the database of user names and user passwords, then initiating authorizing instructions to the computer via data transmission means to (a) temporarily unlock the consumers credit report and allow access to or delivery of the user's credit report to the authorized requester and (b) then relock the user's credit report to prevent access to the user's credit report by an unauthorized requester.

2. The method as defined in claim 1 wherein the third data entry means includes means for masking the user password from the requester.

3. The method as defined in claim 1 wherein the database is capable of storing an authorized requester associated with a user name; said associating step includes storing the requester in the database as an authorized requester associated with the user name, the request for the user's credit report includes identification of the requester, and said execution of the second computer-implemented method further includes determining if the requester identified in the request for the user's credit report is stored in the database as an authorized requestor associated with the user's name.

4. The method as defined in claim 1 wherein said associating step is accomplished via a data entry web page generated within said second computer-implemented method.

* * * * *